United States Patent

Duval

(10) Patent No.: US 11,423,154 B2
(45) Date of Patent: Aug. 23, 2022

(54) ENDPOINT AUTHENTICATION BASED ON BOOT-TIME BINDING OF MULTIPLE COMPONENTS

(71) Applicant: Micron Technology, Inc., Boise, ID (US)

(72) Inventor: Olivier Duval, Pacifica, CA (US)

(73) Assignee: Micron Technology, Inc., Boise, ID (US)

(*) Notice: Subject to any disclaimer, the term of this patent is extended or adjusted under 35 U.S.C. 154(b) by 61 days.

(21) Appl. No.: 17/080,684

(22) Filed: Oct. 26, 2020

(65) Prior Publication Data
US 2022/0129559 A1    Apr. 28, 2022

(51) Int. Cl.
| | |
|---|---|
| *G06F 21/57* | (2013.01) |
| *H04L 9/30* | (2006.01) |
| *H04L 9/32* | (2006.01) |
| *G06F 9/38* | (2018.01) |

(52) U.S. Cl.
CPC .......... *G06F 21/575* (2013.01); *G06F 9/3836* (2013.01); *H04L 9/3073* (2013.01); *H04L 9/3242* (2013.01); *H04L 9/3268* (2013.01); *G06F 2221/034* (2013.01)

(58) Field of Classification Search
CPC .......... G06F 21/575; G06F 9/3836; G06F 2221/034; H04L 9/3073; H04L 9/3242; H04L 9/3268
See application file for complete search history.

(56) References Cited

U.S. PATENT DOCUMENTS

| | | | |
|---|---|---|---|
| 8,677,466 B1* | 3/2014 | Chuang ................. | H04L 63/166 |
| | | | 726/4 |
| 11,108,627 B2 | 8/2021 | Smith et al. | |
| 11,233,655 B2 | 1/2022 | Yang et al. | |
| 2017/0060595 A1* | 3/2017 | Keidar .................... | G06F 21/62 |
| 2018/0024781 A1* | 1/2018 | Pedersen ............... | G06F 3/0679 |
| | | | 711/103 |
| 2020/0213302 A1* | 7/2020 | Saha ....................... | H04L 9/321 |
| 2020/0372188 A1* | 11/2020 | Basak .................... | G06F 21/602 |

OTHER PUBLICATIONS

International Search Report and Written Opinion, PCT/US2021/055011, dated Jan. 27, 2022.
Meng Xu, et al. "Dominance as a New Trusted Computing Primitive for the Internet of Things." IEEE Symposium on Security and Privacy (SP), IEEE, Sep. 16, 2019.

* cited by examiner

*Primary Examiner* — Zahid Choudhury
(74) *Attorney, Agent, or Firm* — Greenberg Traurig

(57) ABSTRACT

A system, method and apparatus to authenticate an endpoint having a secure memory device. For example, at boot time of the endpoint, a cryptographic hash value of the boot loader stored in the memory device is used to generate a device identifier of the memory device; and identification data of multiple components of the endpoint is used with the device identifier of the memory device to generate a first key pair key and a second key. A counter value is retrieved from a monotonic counter to generate a certificate signed using a private key in the first key pair. The certificate can be sent over the computer network to a remote server for authentication using a public key in the first key pair. The second key pair can be authenticated and used to establish encryption for a communication connection between the endpoint and the server.

20 Claims, 6 Drawing Sheets

ENDPOINT AUTHENTICATION BASED ON BOOT-TIME BINDING OF MULTIPLE COMPONENTS

TECHNICAL FIELD

At least some embodiments disclosed herein relate to authentication in general, and more particularly, but not limited to authentication of a communication endpoint having a secure memory device.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
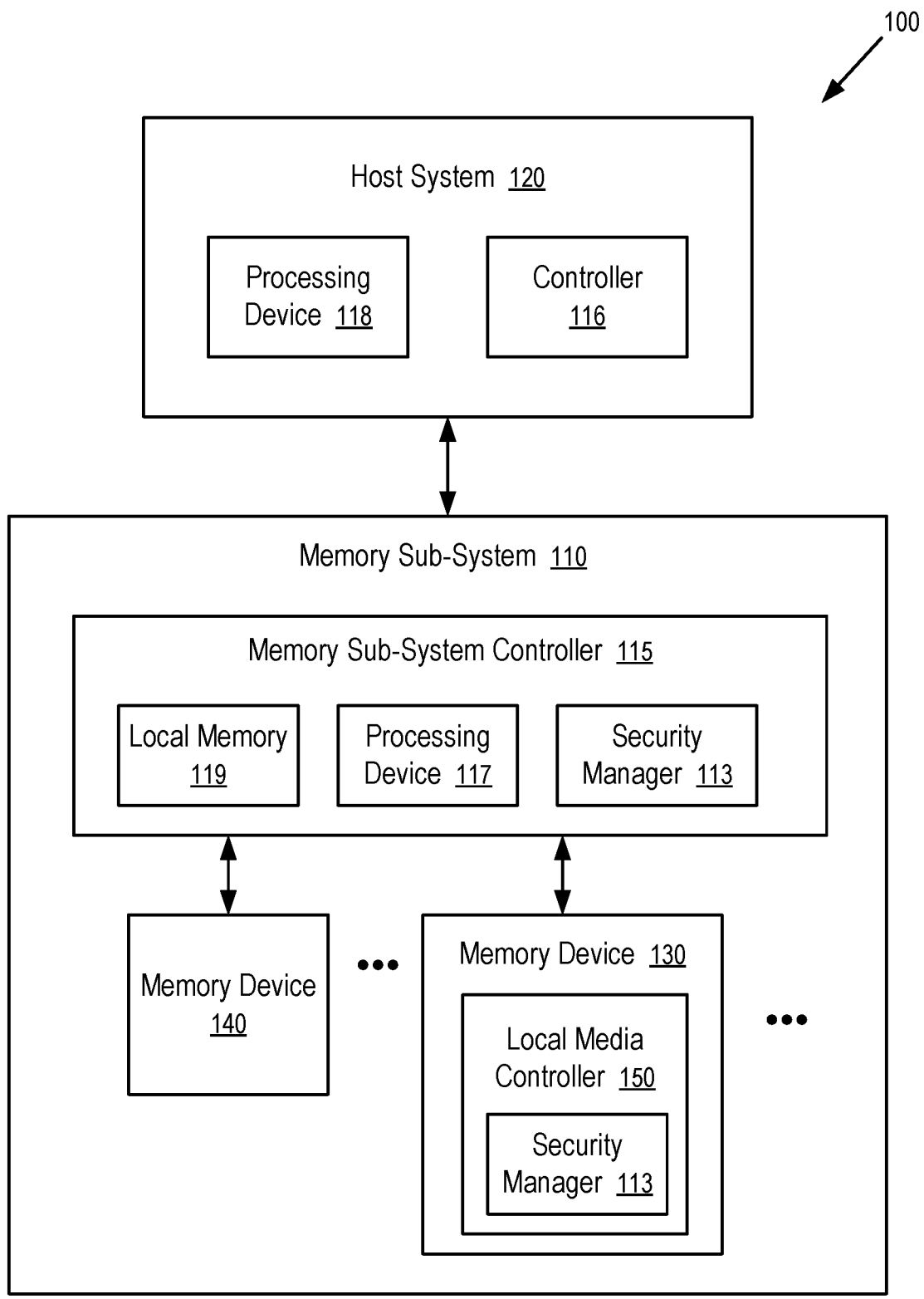
FIG. 1 illustrates an example computing system having a memory sub-system in accordance with some embodiments of the present disclosure.

At least some aspects of the present disclosure are directed to a memory sub-system configured with a security manager that generates, via boot time binding of the memory sub-system with its host system, a certificate for the authentication of the host system. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A secure memory device can store a device secret for its authentication. For example, a unique device secret (UDS) can be injected in the memory device in a secure facility and stored in registers of the memory device. Following algorithms defined by Device Identity Composition Engine (DICE) and the Robust Internet-of-Things (RIoT) standards, a cryptographic key can be generated, at boot time, based on a combination of the unique device secret (UDS) and other non-secret data stored in the secure memory device. The cryptographic key can then be used as a secret and an identity of the memory device.

For example, authentication of the secure memory device can be performed through the verification that the memory device has the cryptographic key and thus the unique secret and stores an untampered version of non-secret data. The memory device can digitally sign a certificate using the cryptographic key. If the digital signature can be verified to have been created using the cryptographic key, the memory device is seen to be in possession of the cryptographic key and thus have the identity associated with the unique device secret.

Digital authentication of a message can be achieved by applying cryptographic functions to the message and using a cryptographic key. Such cryptographic functions include hashing and encryption, which are typically used to generate a header added to the message for authentication. The header can be a hash digest, when using symmetric cryptography, or a digital signature when applying asymmetric cryptography. The recipient of the message can then apply similar cryptographic functions to the received message and use a cryptographic key to authenticate that the message's content was sent by a trusted party, owning the appropriate cryptographic key. The encrypted hash value in the header can be decrypted for comparison with a hash value calculated independently from the message. If there is a match between the hash value calculated from the message and the hash value recovered from decrypting the header (e.g., the digital signature and/or the hash digest), the integrity of the message can be confirmed in view of the hash value; and the header can be seen to have been created using the cryptographic key.

The keys generated at boot time can be used to sign certificates at boot time and immediately discarded to safeguard their secrecy. Alternatively, keys generated at boot time can be kept in memory to be used later at runtime. In some cases, the keys used at boot time are referred to as DICE device ID keys and the keys used at runtime are referred to as DICE alias keys. In some cases, the device ID private key can be used to sign a certificate including the alias public key to attest that the alias key was generated from the secure memory device.

However, it may be possible for a malicious actor to impersonate a secure memory device by stealing a certificate generated at boot time and an alias private key from a valid secure memory device and use them to establish a connection to a remote host. Countermeasures to protect the secrecy of alias private keys on an endpoint can include storing the key in hardware security modules (HSMs), but such devices may not be available in all systems, leaving the alias private key exposed to theft and impersonation attacks.

Additionally, in some applications it may be insufficient to merely verify that a device at an endpoint of a communication contains the secure memory device. For example, the endpoint may contain subsystems that contribute to the endpoint's identity as it tries to establish communication with a remote system. These subsystems can include hardware components and their unique identifier number when it is available, but also their firmware content. It can be desirable to authenticate that endpoints contain the appropriate combination of such subsystems.

At least some aspects of the present disclosure address the above and other deficiencies by strengthening the identity of an endpoint by including multiple components in a boot-time certificate. The combination of the identity of a secure memory device and the identity/identities of one or more other components of the endpoint can represent the endpoint as a whole at the time of booting up. The authentication of such an entity verifies that the endpoint has not only the secure device but also other required components, such as hardware and/or software.

For example, an endpoint is configured to have a secure memory device as one of its multiple components and use to the secure memory device to store instructions to be executed during the boot time of the endpoint. The secure memory device can have a security manager that prevents unauthorized access to the memory capacity. Further the security manager can verify, during the boot time, the integrity of the instructions stored in the secure memory device, before allowing the execution of the instructions, such as firmware, boot loader, operating system, and/or software applications.

Additionally, the identity of an endpoint may include time-related information, to make impersonation attacks more difficult, as certificates may become obsolete. Malicious actors attempting to present an obsolete certificate to a host will be detected in their attempt at impersonating a valid endpoint. Since the certificate also includes the alias public key generated at boot time, the remote host can verify that the endpoint is using the alias private key associated with that public key and not a stolen alias private key obtained earlier.

At boot time, the secure memory device is configured to establish an identity of the endpoint that has the secure memory device and at least one additional component of the endpoint that is outside of the secure memory device. The identity represents the binding of the secure memory device with the at least one additional component at the time of booting to form the endpoint. For example, the identity of the endpoint can be generated based on the identifiers of components of the endpoint at the boot time, such as a cryptographic measure of one or more software images stored outside of the secure memory device, an unique identifier of a hardware component, such as a processor, a network interface card, another memory/storage device, etc. The identity of the endpoint can be represented by a certificate that is generated using a combination of the identifiers collected during the boot time. Such an identity of the endpoint generated at the boot time represents the endpoint as a whole and can be authenticated by a remote server using a corresponding public key associated with the private key used to sign the certificate and side information regarding the device's state.

For example, at boot time, a secure memory device can measure its own first stage boot loader software image to generate an identifier of the secure memory device. Additionally, the identifier of the secure memory device can be dependent on a unique secret of the memory device. The first stage boot loader can be programmed to interrogate multiple components in the computing system at the endpoint to obtain identifiers. For example, the first stage boot loader executed in a processor of the endpoint can determine an identifier of an additional component of the endpoint, such as the processor and/or another device configured in the endpoint. The component identifier can be an unique identifier that is based on a stored serial number of the component, and/or a set of attributes of the component. When the component is software/firmware, the identifier can be based on a measure of the component (e.g., a cryptographic hash value) and/or other attributes of the component (e.g., version number, serial number). The security manager configured in the first stage boot loader can combine the identifiers of the components with the identifier of the secure memory device to produce a pair of a private key and a public key. A certificate can be generated using at least a monotonically increasing counter value and the device ID private key. For example, the device ID private key can be used to generate a digital signature applied on the certificate. After the creation of the certificate, the security manager can discard the device ID private key and does not store the device ID private key in the endpoint, as described in DICE RIoT requirements.

After the computing system of the endpoint completes at least a portion of a boot sequence, the endpoint reaches runtime and can communicate over a computer network. Then, the computing system attempts to communicate over the computer network with a remote computer that has knowledge of both the device ID public key corresponding to the discarded device ID private key and the alias public key corresponding to the alias private key. The remote computer can authenticate the identity of the endpoint using the certificate and the public keys. The authentication verifies not only that the endpoint has the secure memory device at the boot time, but also the additional components represented by the identifiers used to generate the private keys and that the certificate has been signed recently.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or such a computing device that includes memory and a processing device.

The computing system 100 can include a host system 120 that is coupled to one or more memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset (e.g., processing device 118) and a software stack executed by the processor chipset. The processor chipset can include one or more cores, one or more caches, a memory controller (e.g., controller 116) (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel, a Serial Attached SCSI (SAS) interface, a double data rate (DDR) memory bus interface, a Small Computer System Interface (SCSI), a dual in-line memory module (DIMM) interface (e.g., DIMM socket interface that supports Double Data Rate (DDR)), an Open NAND Flash Interface (ONFI), a Double Data Rate (DDR) interface, a Low Power Double Data Rate (LPDDR) interface, or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The processing device 118 of the host system 120 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 120 and the memory sub-system 110. In general, the controller 116 can send commands or requests to the memory sub-system 110 for desired access to memory devices 130, 140. The controller 116 can further include interface circuitry to communicate with the memory sub-system 110. The interface circuitry can convert responses received from memory sub-system 110 into information for the host system 120.

The controller 116 of the host system 120 can communicate with controller 115 of the memory sub-system 110 to perform operations such as reading data, writing data, or erasing data at the memory devices 130, 140 and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits (ICs) and/or discrete components, a buffer memory, a cache memory, or a combination thereof. The controller 116 and/or the processing device 118 can be a microcontroller, special purpose logic circuitry (e.g., a field programmable gate array (FPGA), an application specific integrated circuit (ASIC), etc.), or another suitable processor.

The memory devices 130, 140 can include any combination of the different types of non-volatile memory components and/or volatile memory components. The volatile memory devices (e.g., memory device 140) can be, but are not limited to, random access memory (RAM), such as dynamic random access memory (DRAM) and synchronous dynamic random access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations (e.g., in response to commands scheduled on a command bus by controller 116). The controller 115 can include hardware such as one or more integrated circuits (ICs) and/or discrete components, a buffer memory, or a combination thereof. The hardware can include digital circuitry with dedicated (e.g., hard-coded) logic to perform the operations described herein. The controller 115 can be a microcontroller, special purpose logic circuitry (e.g., a field programmable gate array (FPGA), an application specific integrated circuit (ASIC), etc.), or another suitable processor.

The controller 115 can include a processing device 117 (e.g., processor) configured to execute instructions stored in a local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 does not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory devices 130. The controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory devices 130.

In some embodiments, the memory devices 130 include local media controllers 150 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 150) for media management within the same memory device package. An example of a managed memory device is a managed NAND (MNAND) device.

The controller 115 and/or a memory device 130 can include a security manager 113 configured to generate a certificate that can be used to authenticate that the computing system 100, as an endpoint in a computer network, has a particular combination of the memory device 130 with one or more other components. In some embodiments, the controller 115 and/or the local media controller 150 in the memory sub-system 110 can include at least a portion of the security manager 113. In other embodiments, or in combination, the controller 116 and/or the processing device 118 in the host system 120 can include at least a portion of the security manager 113. For example, the controller 115, the controller 116, and/or the processing device 118 can include logic circuitry implementing the security manager 113. For example, the controller 115, or the processing device 118 (e.g., processor) of the host system 120, can be configured to execute instructions stored in memory for performing the operations of the security manager 113 described herein. In some embodiments, the security manager 113 is implemented in an integrated circuit chip disposed in the memory sub-system 110. In other embodiments, the security manager 113 can be part of firmware of the memory sub-system 110, an operating system of the host system 120, a device driver, or an application, or any combination therein.

For example, the security manager 113 can determine a cryptographic hash value of a set of instructions to be executed during boot time of the computing system 100. The security manager 113 can check the integrity of the set of instructions by comparing the hash value computed at the boot time with a pre-calculated hash value. If the two hash value agrees with each other, the set of instructions can be considered to have not been tampered with and/or corrupted. Thus, the set of instructions can be executed in the computing system 100 to further implement the security operations of the security manager 113 and/or the boot operations of the computing system 100. Optionally, the verification of the hash value can be part of the authentication of the computing system 100 as an endpoint using a certificate generated through the execution of at least a portion of the set of instructions during the boot time of the computing system 100.

For example, an identifier of the memory device 130 can be generated based at least in part on the hash value of the set of instructions. Thus, when the identifier of the memory device 130 is verified through the authentication using the certificate, the hash value of the set of instructions can be considered to have been verified as correct; and the set of instructions used to generate the certificate and to boot up the computing system 100 has not been tampered with and/or corrupted.

The execution of the set of instructions in the computing system 100 causes the computing system 100 to determine the identifies of other components of the computing system 100, such as an identifier of the processing device 118, an identifier of the controller 116, an identifier of the memory sub-system controller 115, an identifier of the memory device 140, and/or an identifier of a software program (e.g., an operating system, a device driver, an application program, etc.). The set of identifiers of the components in the computing system 100 having the memory device 130, including the identifier of the memory device 130, can be combined to generate a cryptographic key for the signing of a certificate. The certificate is based on a monotonically increasing counter value that increases every time the computing system 100 is booted up and/or every time the memory device 130 performs a secure operation. Optionally, the certificate can show some of the identifiers used to generate the cryptographic key used to sign the certificate. The certificate may also include a DICE alias public key generated at boot time.

The certificate can be communicated with a remote computer over a computer network for authentication. When the certificate is authenticated, it can be concluded that the integrity of the set of instructions used to generate the certificate is intact, and the computing system 100 has the memory device 130 in combination with the set of components represented by the identifiers used to generate the cryptographic key that is used to sign the certificate. Additionally, the monotonic counter value included in the certificate allows its recipient to verify that it was generated recently, and thus that it can be trusted. The certificate holds a DICE alias public key, which can be compared with the DICE alias public key stored on the remote computer. If the two keys match, then the remote computer can trust further messages sent by the endpoint and signed with the DICE alias private key.

Figure 2:
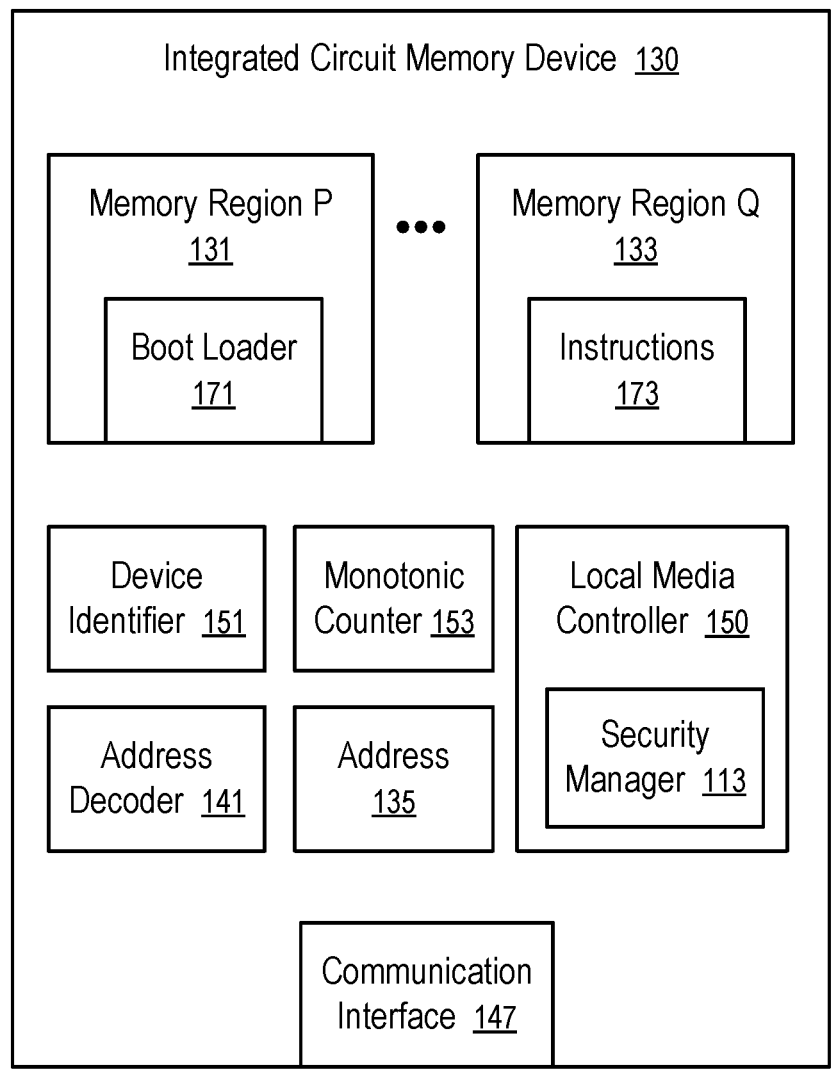
FIG. 2 illustrates an integrated circuit memory device having a security manager according to one embodiment.

FIG. 2 illustrates an integrated circuit memory device having a security manager according to one embodiment. For example, the memory devices 130 in the memory sub-system 110 of FIG. 1 can be implemented using the integrated circuit memory device 130 of FIG. 2.

The integrated circuit memory device 130 can be enclosed in a single integrated circuit package. The integrated circuit memory device 130 includes multiple memory regions 131, . . . , 133 that can be formed in one or more integrated circuit dies. A typical memory cell in a memory region 131, . . . , 133 can be programmed to store one or more bits of data.

The local media controller 150 can include at least a portion of a security manager 113 that is configured to control access to at least one of the memory regions 131, . . . , 133.

For example, the security manager 113 can control access to a memory region 131 based on a cryptographic key that is generated based on a secret of the integrated circuit memory device 130 and/or a cryptographic key representative of an owner or an authorized user of the memory device 130. When a request to write data into the memory region 131 is received in the integrated circuit memory device 130, the security manager 113 can verify whether the request can be permitted based on whether the requester is in possession of the cryptographic key. For example, the requester may digitally sign the request, or a challenge message, using the cryptographic key to indicate that requester has the permission to write data into the memory region 131.

The integrated circuit memory device 130 has a communication interface 147 to receive a command having an address 135 from the controller 115 of a memory sub-system 110. In response to the address 135 identifying a memory region 131 that requires access control, the security manager 113 performs cryptographic operations to verify that the request is from a requester having the cryptographic key authorized for the access to the memory region 131, before providing memory data retrieved from the memory region 131 using an address decoder 141. The address decoder 141 of the integrated circuit memory device 130 converts the address 135 into control signals to select a group of memory cells in the integrated circuit memory device 130; and a local media controller 150 of the integrated circuit memory device 130 performs operations to determine the memory data stored in the memory cells at the address 135.

For example, the memory region 131 can store a boot loader 171. At boot time, the security manager 113 can measure the boot loader 171 by computing a cryptographic hash value of the boot loader 171. The cryptographic hash value of the boot loader 171 can be used to generate a device identifier 151 of the integrated circuit memory device 130. The boot loader 171 (and/or an operating system or a device driver, or a security application) can include instructions to implement a portion of the security manager 113. During the boot time, the instructions can determine the configuration of the computing system 100 in which the integrated circuit memory device 130 is a component.

For example, the configuration of the computing system 100 of FIG. 1 can include the major software/firmware components of the memory sub-system 110. The software/firmware can be stored in other memory devices (e.g., 140), or in the memory device 130 in a memory region 133. For example, the instructions 173 in the memory region 133 in the integrated circuit memory device 130 can include the operating system of the computing system 100, device drivers, firmware, and/or software applications. Some of the major software/firmware components of the memory sub-system 110 can be stored outside of the memory region(s) under the access control of the security manager 113 and/or outside of the integrated circuit memory device 130. The identifiers of the software/firmware components can include component identifications, version numbers, serial numbers, and/or cryptographic hash values of the software/firmware components.

The configuration of the computing system 100 of FIG. 1 can include the major hardware components of the memory sub-system 110, such as the processing device 118 and/or the controller 116. The host system 120 can further include peripheral devices, such as a network interface card, a communication device, another memory sub-system, etc. The identifiers of the hardware components can include serial numbers, addresses, identification numbers, etc.

The configuration information of the computing system 100, including the device identifier 151 can be used to generate a cryptographic key to sign a certificate generated using at least the value from a monotonic counter 153. The security manager 113 is configured to increase the monotonic counter 153 for each use of the boot loader 171 to start the computing system 100 in which the memory device 130 is configured.

Figure 3:
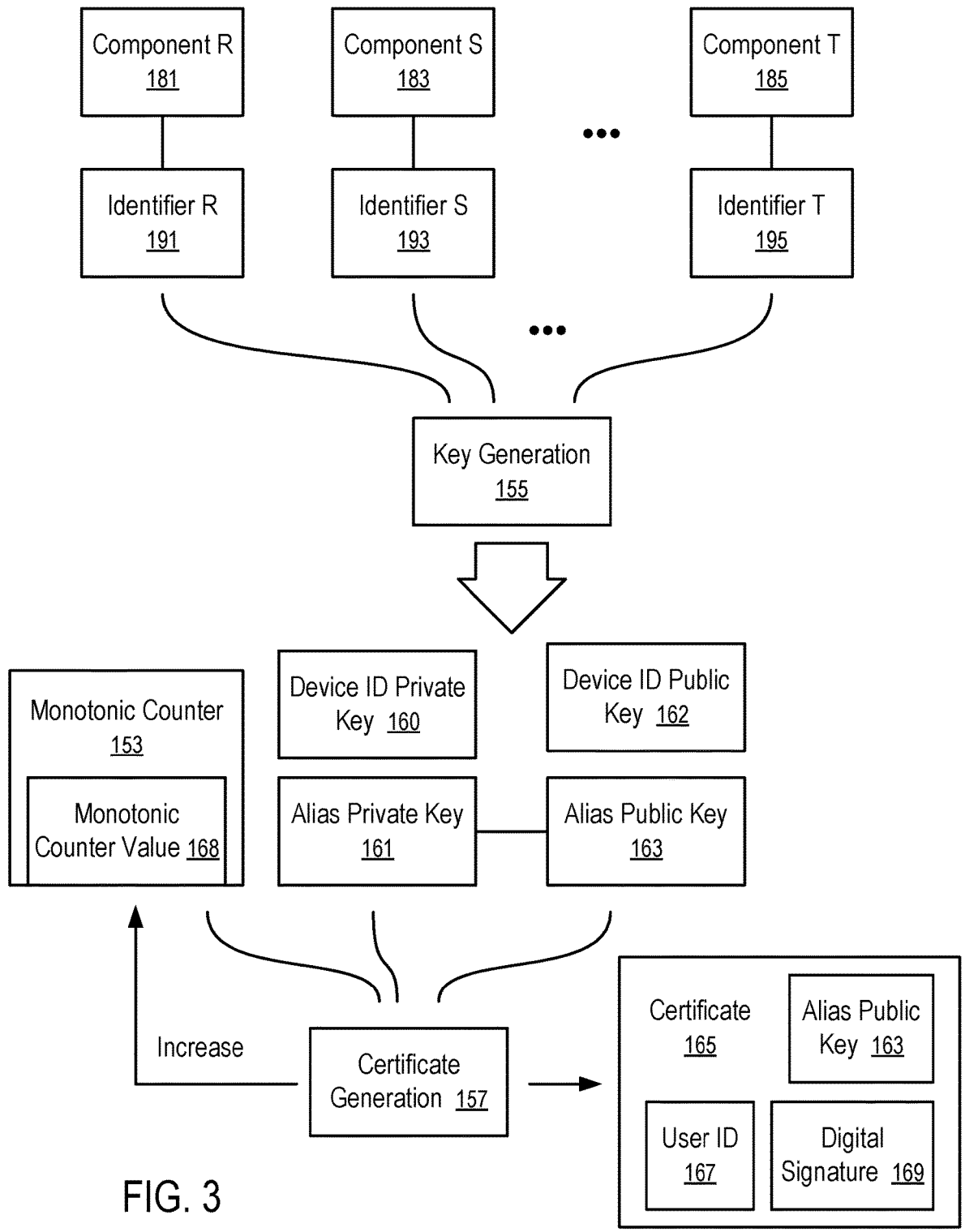
FIG. 3 illustrates the generation of a certificate for endpoint authentication according to one embodiment.

FIG. 3 illustrates the generation of a certificate for endpoint authentication according to one embodiment. For example, the security manager 113 illustrated in FIGS. 1 and/or 2 can generate a certificate using the technique of FIG. 3 at boot time of a computing system 100.

In FIG. 3, a computing system 100 has a set of components 181, 183, . . . , 185. The components 181, 183, . . . , 185 can include software components and/or hardware components. The components 181 to 185 can have corresponding identifiers 191, 193, . . . , 195. For example, a component S 183 can be a software component having an identifier S 193; and a component T 185 can be a hardware component having a separate identifier T 195.

An identifier of a component identifies at least some unique aspects of the component. In some instances, an identifier can uniquely identify a component among similar components having the same or similar functions. For example, an identifier of a software component can include or based on a cryptographic hash value of the software component and/or a serial number of the software component. For example, an identifier of a hardware component can be based on a type, a description, a serial number, and/or an address of the hardware component.

An operation of key generation 155 is performed to obtain a first pair of a device ID private key 160 and a device ID public key 162 and a second pair of an alias private key 161 and an alias public key 163. For example, using asymmetric cryptography, cipher text generated using the alias private key 161 can be decrypted using the alias public key 163; and cipher text generated using the alias public key 163 can be decrypted using the alias private key 161. Since it is very difficult to determine the alias private key 161 from the alias public key 163, revealing the alias public key 163 would not compromise the secrecy of the alias private key 161.

An operation of certificate generation 157 is performed to generate a certificate 165 that contains a digital signature 169 signed using the device ID private key 160. The certificate 165 contains data to be signed, including the alias public key 163 and the current monotonic counter value 168. A side-effect of the certificate generation 157 is increasing the value 168 of the monotonic counter 153.

Optionally, the certificate 165 can include a user ID 167, such as a name, an email address, a registered user name, or another identifier of an owner or authorized user of the computing system 100 in which the certificate 165 is created.

Optionally, the certificate 165 can include some of the identifiers 191 to 195 and/or the value of the monotonic counter 153.

Optionally, some of the information provided via the certificate can be in an encrypted form. For example, the information can be encrypted using a public key of a server that is authorized to access the encrypted information, such as a server that is configured to authenticate the digital signature 169.

The security manager 113 is configured to generate a certificate 165 during each instance of booting up the computing system 100 using the boot loader 171 secured in the memory device 130. A certificate 165 generated based on a higher value of the monotonic counter 153 invalidates the certificates generated using lower values of the monotonic counter 153. The remote host will refuse any certificate with lower monotonic counter value than the one used for the last successful connection.

Preferably, after the certificate 165 is generated, the device ID private key 160 is purged from the computing system 100 and the memory device 130. A set of instructions protected by the security manager 113 can be executed to use the certificate 165 generated at the boot time to authenticate the computing system 100 as an endpoint in a computer network. A remote server having the device ID public key 162 can verify that digital signature 169 and the configuration of the computing system 100 as identified by the identifiers 191 to 195 used in the key generation 155.

Figure 4:
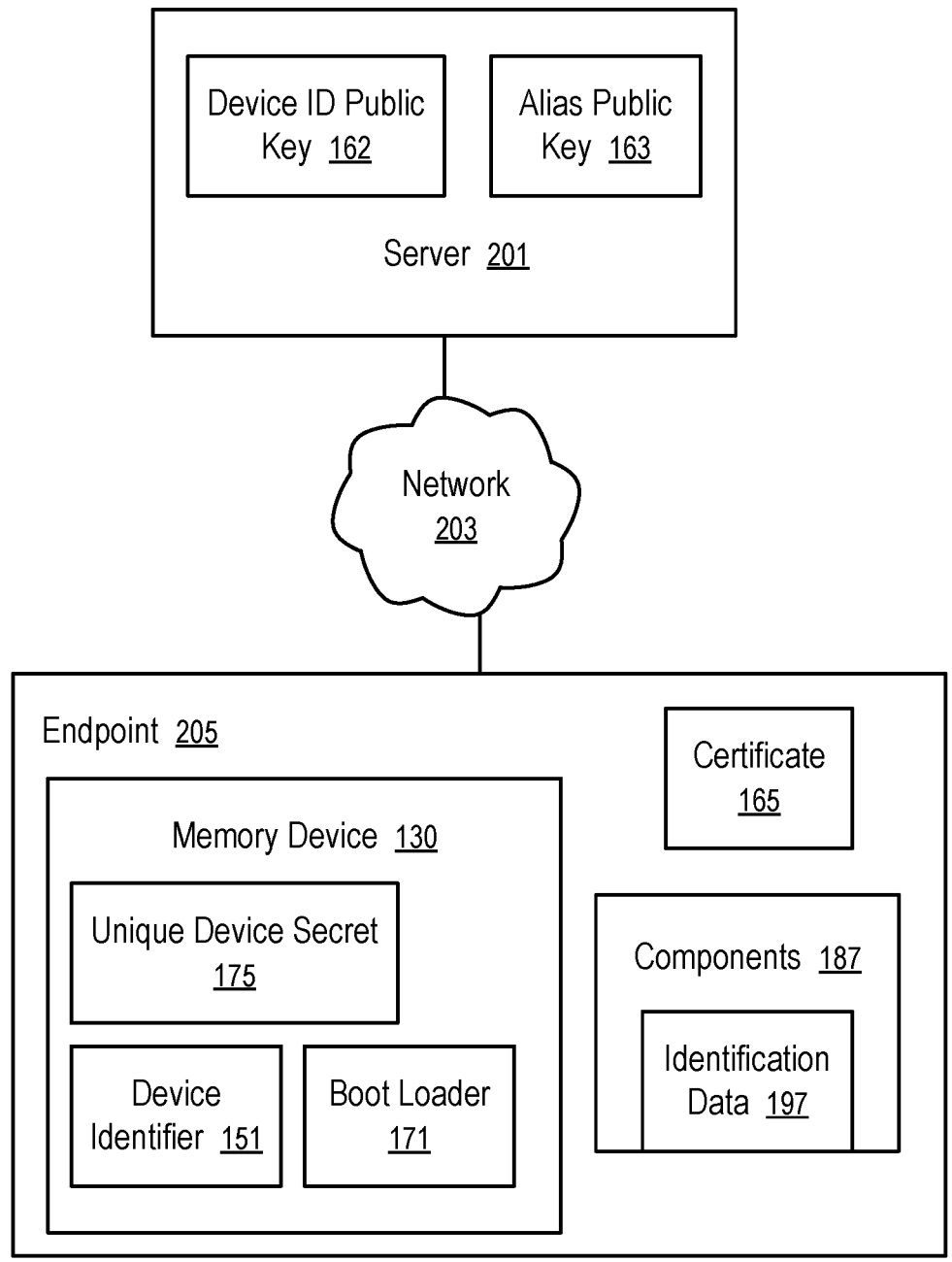
FIG. 4 illustrates the use of a certificate for endpoint authentication according to one embodiment.

FIG. 4 illustrates the use of a certificate for endpoint authentication according to one embodiment. For example, an endpoint 205 in FIG. 4 can be a computing system 100 of FIG. 1 having a security manager 113 configured in the integrated circuit memory device 130 of FIG. 2. The authentication can be performed using a certificate 165 generated using the technique of FIG. 3.

In FIG. 4, the endpoint 205 includes a memory device 130 that has a unique device secret 175. A device identifier 151 of the memory device 130 can be generated using a unique device secret 175 and a cryptographic measure of the boot loader 171. For example, the cryptographic measure of the boot loader 171 can be obtained by reading the boot loader 171 prior to its execution and applying a cryptographic hash function to the boot loader 171 to obtain a cryptographic hash value of the boot loader 171 that is to be executed.

The endpoint 205 has additional components 187 that have identification data 197. The combination of the device identifier 151 and the identification data 197 can be used to generate a certificate 165 in a way as illustrated in FIG. 3.

A server 201 connected to the endpoint 205 via a computer network 203 is provisioned to contain the device ID public key 162 corresponding to the device ID private key 160 used to sign the certificate 165. The server 201 can determine whether the certificate 165 is valid by decrypting the digital signature 169 using the device ID public key 162.

For example, when the memory device 130 is initially used in the endpoint 205 to boot up the endpoint 205, the endpoint 205 can register its identity with the server 201 by providing the device ID public key 162. The registration operation can include the storing of the device ID public key 162 to indicate that an endpoint 205, having a certificate verifiable via the device ID public key 162, is an authorized user. The device ID public key 162 can be associated with an identification of an owner and/or an authorized user of the endpoint 205.

The certificate 165 includes the value 168 of the monotonic counter 153 at the time of booting up the endpoint 205.

Optionally, the certificate 165 can include some of the identifiers 191 to 195 used to generate the alias private key 161, the alias public key 163, the device ID private key 160, and the device ID public key 162.

In some embodiments, the server 201 has a copy of the unique device secret 175. For example, the memory device 130 can be registered in a manufacturing facility of memory device 130 such that the device identifier 151 can be regenerated independently in a secure server (e.g., 201). When the server 201 receives the additional identifiers (e.g., 193 to 195, such as the identification data 197) from the endpoint 205, the secure server (e.g., 201) can independently compute the public key 163 for the authentication of the digital signature 169. Optionally, the certificate 165 can include the additional identifiers (e.g., 193 to 195, such as the identification data 197). Thus, when some of the components 187 have been replaced, the server 201 can determine whether to accept the change to the endpoint 205 or to require further verification that the endpoint 205 is legitimated and/or associated with a known owner or an authorized user.

For example, a set of instructions secured via the memory device 130 can be executed in the endpoint 205 to communicate the certificate 165 from the endpoint 205 to the server 201 for authentication. The certificate 165 of the endpoint 205 is generated at the time of booting up the endpoint 205 to represent the configuration of the endpoint 205 via the set of identifiers 191 to 195. After verifying that the certificate 165 is generated using the device ID private key 160 that represents the identifiers 191 to 195, the server 201 can determine whether the endpoint 205 having the configuration is permitted to operate and/or receiver services. In some instances, the server 201 can allow the endpoint 205 to replace certain components and/or have a replacement frequency below a threshold to pass authentication. Based on the response, the endpoint 205 can prompt the user to register, to demonstrate ownership or authorization to use, or to shut down.

Optionally, the server 201 can track the highest value of the monotonic counter 153 of the endpoint 205 as seen in the certificates from the endpoint 205 and/or the memory device 130. A certificate generated based on a counter value equal to or lower than the latest counter value used in a successful connection of one endpoint 205 to the server 201 can be described as obsolete. Endpoints 205 presenting an obsolete certificate will not be granted access to servers 201.

In some embodiments, the server 201 has a copy of the alias public key 163. When establishing a connection with the endpoint 205, and after verifying the certificate 165 has a valid digital signature 169 and a not-obsolete monotonic counter value 168, the server 201 may verify the alias public key 163 portion of the certificate. If the alias public key 163 stored in the server 201 and the alias public key 163 included in the certificate 165 do not match, then a connection with the endpoint 205 may not be allowed. This check can be used to prevent attacks where the malicious actor is able to steal the alias private key 161 from a valid device and use it on a device with a compromised identifier (e.g., one of device identifiers 151, 191, 193, . . . , 195). If the keys match, then the alias private key 161 available at runtime on the endpoint 205 may be used to sign content that may be verified by the server 201.

For example, as part of a connection establishment procedure, the server 201 may issue a challenge to the endpoint 205, which signs the response with the alias private key 161 and sends it back to the server 201. The server 201 may then use its copy of the alias public key 163 and verify that the challenge was signed by a valid endpoint 205.

Figure 5:
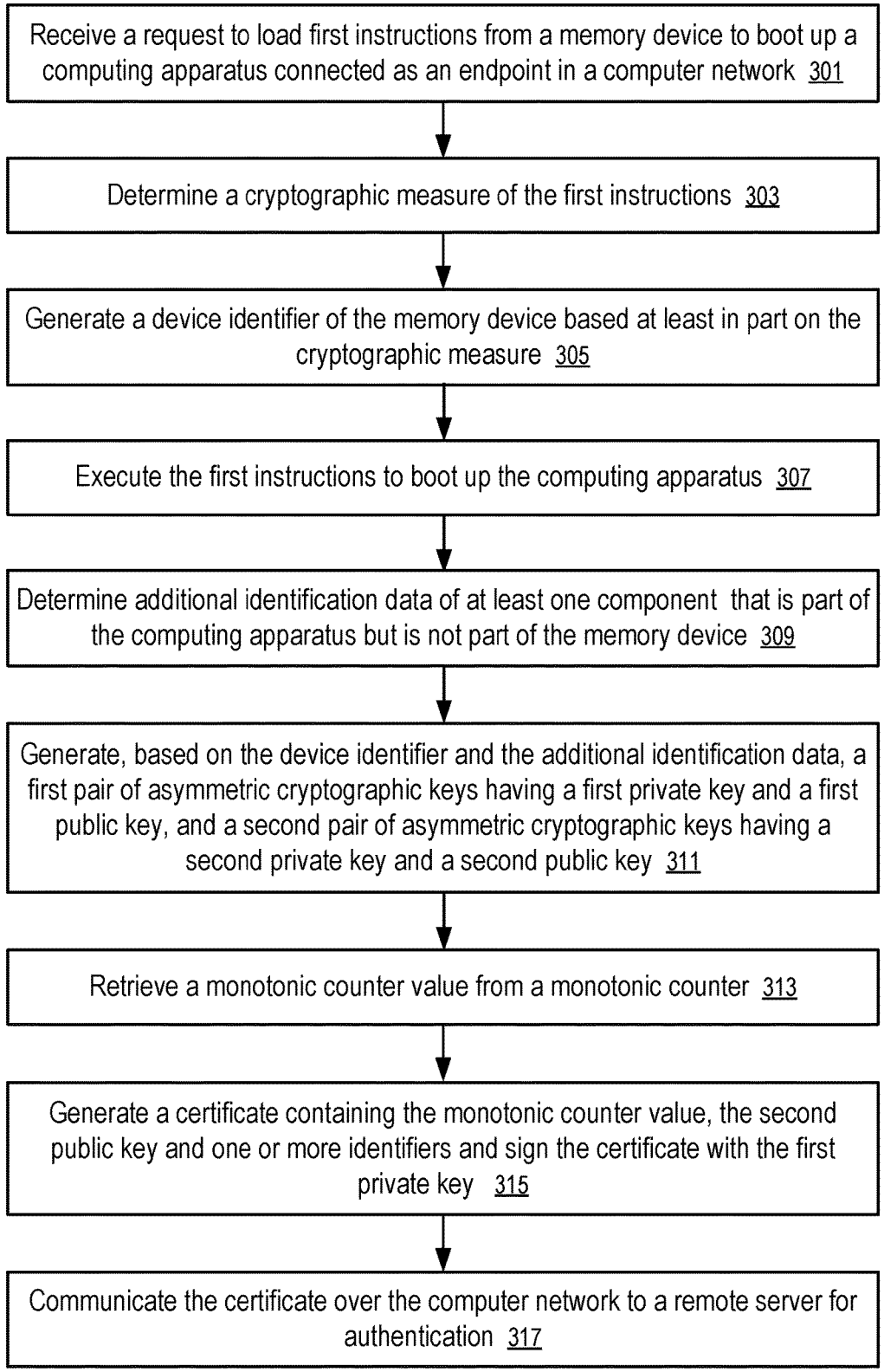
FIG. 5 shows a method of endpoint authentication according to one embodiment.

FIG. 5 shows a method of endpoint authentication according to one embodiment. The method of FIG. 5 can be performed by processing logic that can include hardware (e.g., processing device, circuitry, dedicated logic, programmable logic, microcode, hardware of a device, integrated circuit, etc.), software/firmware (e.g., instructions run or executed on a processing device), or a combination thereof. In some embodiments, the method of FIG. 5 is performed at least in part by the controller 150 and/or controller 115 of FIG. 1, or processing logic in the memory device 130 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In FIG. 5, at block 301, a request is received, in a computing apparatus connected as an endpoint 205 in a computer network 203, to load first instructions from a memory device 130 to boot up.

For example, the first instructions can include a boot loader 171, an operating system, a device driver, or a security application, or any combination thereof.

At block 303, the memory device 130 determines a cryptographic measure of the first instructions.

For example, the cryptographic measure can be determined by applying a cryptographic hash function to data representative of the first instructions to generate a cryptographic hash value.

At block 305, the memory device 130 generates a device identifier 151 of the memory device 130 based at least in part on the cryptographic measure.

At block 307, the endpoint 205 executes the first instructions to boot up.

At block 309, the endpoint 205 determines additional identification data 197 of at least one component 187 that is part of the computing apparatus but is not part of the memory device 130.

For example, the identification data 197 can include a description of the component 187, a serial number of the component 187, an attribute of the component 187, an address of the component 187, or an unique identifier of the component 187, or any combination thereof.

For example, when the component 187 includes a software component having second instructions, the attribute of the component 187 can include a cryptographic measure of the software component, such as a value computed by applying the cryptographic hash function to data representative of the software component.

At block 311, the endpoint 205 generates, based on the device identifier 151 and the additional identification data 197, a first pair of asymmetric cryptographic keys having a first private key (e.g., device ID private key 160) and a first public key (e.g., device ID public key 162), and a second pair of asymmetric cryptographic keys having a second private key (e.g., alias private key 161) and a second public key (e.g., alias public key 163).

Optionally, the memory device 130 has a unique device secret 175. The device secret can be used in the generation of the pairs of asymmetric cryptographic keys and/or the device identifier 151.

At block 313, the endpoint 205 retrieves a monotonic counter value 168 from a monotonic counter 153 and instructs/causes the monotonic counter 153 to increment its value.

At block 315, the endpoint 205 generates a certificate 165 containing the monotonic counter value 168, the second public key (e.g., alias public key 163) and one or more identifiers and signs the certificate with the first private key (e.g., device ID private key 160).

For example, the certificate 165 can be generated by applying a digital signature 169 to the certificate 165 using the first private key (e.g., device ID private key 160). The digital signature 169 can include cipher text of a cryptographic hash value of a message provided in the certificate 165 where the cipher text is generated by encrypting the hash value using the first private key (e.g., device ID private key 160).

Optionally, the endpoint 205 purges the first private key (e.g., device ID private key 160) from the endpoint 205 and/or the memory device 130 after the certificate 165 is generated. Preferably, the certificate 165 is generated within the memory device 130; and the memory device 130 does not communicate the first private key (e.g., device ID private key 160) to outside of the memory device 130.

For example, the message of the certificate 165 can explicitly identify the value retrieved from the monotonic counter 153 configured in the memory device 130. For example, the monotonic counter 153 can be instructed to increase its stored value in response to a read of its stored value using a command to the secure memory device 130.

Optionally, the message of the certificate 165 can identify at least some of the identifiers 191, 193, . . . , 195 used in the key generation 155 of the first private key (e.g., device ID private key 160).

For example, the first public key 162 and the second public key (e.g., alias public key 163) and/or the identifiers 191, 193, . . . , 195 configured to be part of the certificate 165 can be transmitted to the server 201 during a registration process. Subsequently, the first public key 162 can be used to authenticate the certificate 165 signed using the first private key (e.g., device ID private key 160). When the certificate 165 is valid, the server 201 can conclude that the certificate 165 is generated by an endpoint 205 having the memory device 130 with intact first instructions (e.g., boot loader 171), where the endpoint 205 has the component configuration represented by the set of identifiers 191 to 195.

At block 317, the endpoint 205 communicates the certificate 165 over the computer network 203 to a remote server 201 for authentication. In response, the remote server 201 can use the first public key 162 to verify the digital signature 169 applied on the certificate 165, verify that the monotonic counter value 168 provided in the certificate 165 is higher than the one used during the last connection, and verify that the second public key (e.g., alias public key 163) provided in the certificate 165 matches the one stored on the server 201.

After the authentication of the certificate 165, the server 201 and the endpoint 205 can establish a secure connection using a standard protocol, such as Transport Layer Security (TLS) or Secure Sockets Layer (SSL), and the second key pair, trusting that the endpoint's private keys were generated from a valid device with an untampered boot loader 171.

For example, the operations in blocks 309 to 315 and/or the operation in block 317 can be performed via the execution of at least a portion of the first instructions.

Figure 6:
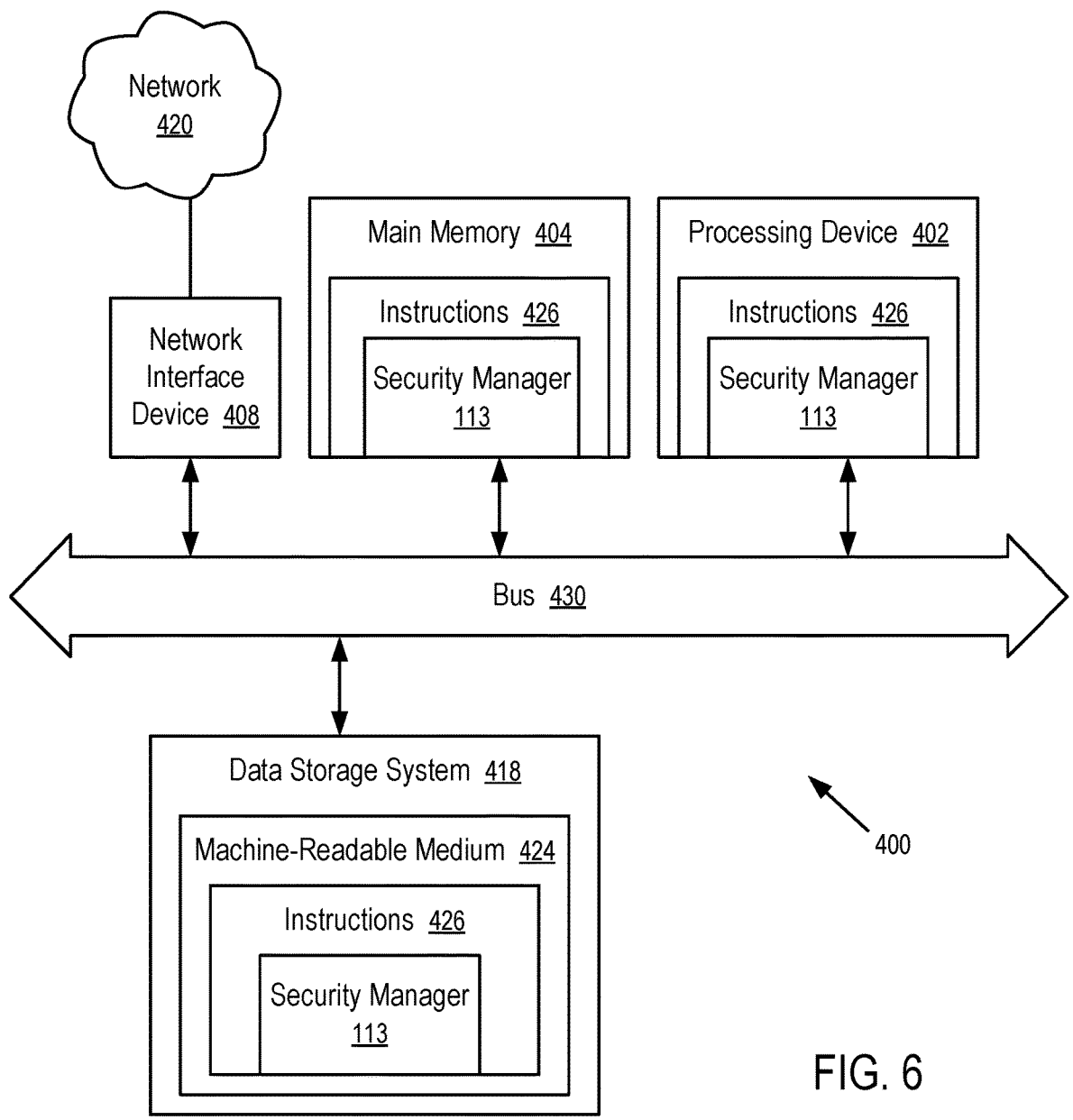
FIG. 6 is a block diagram of an example computer system in which embodiments of the present disclosure can operate.

FIG. 6 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a security manager 113 (e.g., to execute instructions to perform operations corresponding to the security manager 113 described with reference to FIGS. 1-5). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 418, which communicate with each other via a bus 430 (which can include multiple buses).

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable medium 424, data storage system 418, and/or main memory 404 can correspond to the memory sub-system 110 of FIG. 1.

In one embodiment, the instructions 426 include instructions to implement functionality corresponding to a security manager 113 (e.g., the security manager 113 described with reference to FIGS. 1-5). While the machine-readable medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
receiving a request to load first instructions from a memory device to boot up a computing apparatus connected as an endpoint in a computer network; and
in response to the request,
determining a cryptographic measure of the first instructions;
generating a device identifier of the memory device based at least in part on the cryptographic measure; and
executing the first instructions to boot up the computing apparatus, including:
determining identification data of at least one component that is part of the computing apparatus but is not part of the memory device;
generating, based on the identification data and the device identifier, a first pair of asymmetric cryptographic keys and a second pair of asymmetric cryptographic keys, the first pair having a first private key and a first public key, and the second pair having a second private key and a second public key;
retrieving a counter value from a monotonic counter;
generating a certificate based on the counter value, the second public key, and the first private key; and
communicating the certificate over the computer network to a remote server for authentication.

2. The method of claim 1, wherein the identification data includes a description of the component, a serial number of the component, an attribute of the component, an address of the component, or an unique identifier of the component, or any combination thereof.

3. The method of claim 2, wherein the component includes a software component having second instructions; and the attribute of the component includes a cryptographic measure of the software component.

4. The method of claim 1, wherein the first instructions includes a boot loader, an operating system, a device driver, or a security application, or any combination thereof.

5. The method of claim 4, wherein the determining of the cryptographic measure of the first instructions includes applying a cryptographic hash function to data representative of the first instructions to generate a cryptographic hash value.

6. The method of claim 5, wherein the certificate identifies the counter value retrieved from the monotonic counter configured in the memory device.

7. The method of claim 6, wherein the counter value provided in the certificate invalidates prior certificates that are generated by the computing apparatus to provide counter values smaller than the counter value provided in the certificate.

8. The method of claim 7, wherein the certificate identifies the second public key to be matched with a corresponding key stored in the remote server for authentication.

9. The method of claim 8, further comprising:
establishing, between the computing apparatus and the remote server, a secure communication connection using the second private key.

10. A memory device, comprising:
a memory region configured to store first instructions executable to boot up a computing apparatus having the memory device and connected as an endpoint in a computer network; and
a controller configured to, in response to a request to load the first instructions for execution:
determine a cryptographic measure of the first instructions stored in the memory region;
generate a device identifier of the memory device based at least in part on the cryptographic measure;
provide the first instructions for execution in the computing apparatus to boot up the computing apparatus, wherein execution of the first instructions causes the computing apparatus to determine identification data of at least one component that is part of the computing apparatus but is not part of the memory device;
generate, based on the identification data and the device identifier, a first pair of asymmetric cryptographic keys and a second pair of asymmetric cryptographic keys, the first pair having a first private key and a first public key, and the second pair having a second private key and a second public key;
retrieve a counter value from a monotonic counter;
generate a certificate based on the counter value, the second public key, and the first private key; and
communicate the certificate over the computer network to a remote server for authentication.

11. The memory device of claim 10, further comprising:
an integrated circuit package configured to enclose the memory device.

12. The memory device of claim 11, wherein the controller is configured to:
generate the certificate by applying a digital signature to the certificate using the first private key; and
purge the first private key from the computing apparatus after the certificate is generated.

13. The memory device of claim 12, wherein the identification data includes a description of the component, a serial number of the component, an attribute of the component, an address of the component, or an unique identifier of the component, or any combination thereof; and the first instructions includes a boot loader, an operating system, a device driver, or a security application, or any combination thereof.

14. The memory device of claim 13, wherein the cryptographic measure includes a cryptographic hash value generated by applying a cryptographic hash function to the first instructions.

15. The memory device of claim 14, further comprising:
the monotonic counter configured to increase the counter value stored in the counter when the counter value is retrieved from the monotonic counter.

16. A non-transitory computer storage medium storing instructions which, when retrieved from a memory device for execution in a computing apparatus having the memory device, cause the computing apparatus to perform a method, the method comprising:
determining a cryptographic measure of the instructions stored in the memory device;
generating a device identifier of the memory device based at least in part on the cryptographic measure;
booting up the computing apparatus;
determining identification data of at least one component that is part of the computing apparatus but is not part of the memory device;
generating, based on the identification data and the device identifier, a first pair of asymmetric cryptographic keys and a second pair of asymmetric cryptographic keys, the first pair having a first private key and a first public key, and the second pair having a second private key and a second public key;
retrieving a counter value from a monotonic counter;
generating a certificate based on the counter value and the first private key; and
communicating the certificate over a computer network to a remote server to facilitate authentication of the component apparatus as an endpoint in the computer network.

17. The non-transitory computer storage medium of claim 16, wherein the method further comprises:
applying a digital signature to the certificate using the first private key; and
purging the first private key from the computing apparatus after the certificate is generated.

18. The non-transitory computer storage medium of claim 17, wherein the method further comprises:
providing the first public key to the remote server for association with a user identification.

19. The non-transitory computer storage medium of claim 18, wherein the certificate identifies the second public key; and the method further comprises:
establishing a secure communication connection between the computing apparatus and the remote server using the second private key.

20. The non-transitory computer storage medium of claim 18, wherein the certificate further provides the counter value to render obsolete certificates signed using the first private key and identifying counter values smaller than the counter value provides in the certificate.

* * * * *